Patented May 15, 1951

2,553,532

UNITED STATES PATENT OFFICE 2,553,532

TETRAHYDRONAPHTHOLS

James H. Hunter and Jerome Korman, Kalamazoo, Mich., assignors to The Upjohn Company, Kalamazoo, Mich., a corporation of Michigan No Drawing. Application March 22, 1947,
Serial No. 736,598

5 Claims. (Cl. 260—473)

1

This invention relates to 2-methyl-2-carboxy-1-alkyl-1,2,3,4-tetrahydronaphthols and derivatives having the following general formula:

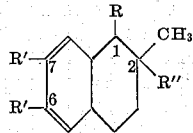

wherein R is CH₃—CH= or

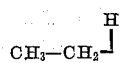

wherein one R' is hydroxy or alkoxy, the other R' being hydrogen, and wherein R'' is carboxy or carbomethoxy. The preferred embodiment of the invention resides in such compounds wherein R'' represents a free carboxy group, and those wherein one R' is a methoxy group, the other R' being hydrogen.

An object of the present invention is the provision of certain novel chemical compounds having hormone-like activity. The compounds are also useful intermediates in the chemical synthesis of other physiologically active compounds. An additional object of the invention is the provision of a process for the preparation of certain novel chemical compounds. Still other objects of the invention will become apparent hereinafter.

The products of this invention may be prepared from a 6-alkoxy-2-methyl-2-carbomethoxy-1-keto-1,2,3,4-tetrahydronaphthalene (Bachman and Thomas, J. Am. Chem. Soc. 64, 95, 1942) or a 7-alkoxy-2-methyl-2 - carbomethoxy - 1 - keto-1,2,3,4-tetrahydronaphthalene. The latter compounds may be prepared from 7-alkoxy-1-keto-1,2,3,4-tetrahydronaphthalenes (Haworth and Sheldrick, J. Chem. Soc. 1934, 1951) by the same reactions as used for the preparation of a 6-alkoxy ketone. The 6 or 7 alkoxy groups may be any one of methoxy, ethoxy, propoxy, isopropoxy, and the like, all of which are prepared in the same general manner as the methoxy.

These intermediate ketones are reacted with an ethylmagnesium halide to give a tertiary alcohol which is dehydrated, preferably with 85 per cent formic acid, yielding the alkoxy-2-methyl-2-carbomethoxy - 1 - ethylidene-1,2,3,4-tetrahydronaphthalene. Other methods of dehydration may be employed, such as a dehydrogenation with hydrogen bromide, with or without distillation, or distillation alone.

The esters are hydrolyzed to the corresponding acids, the 7-alkoxy esters being hydrolyzable

2 with aqueous alkali, while the 6-alkoxy esters are hydrolyzable by alcoholic alkali. Reversal of solvents for the alkali results in decomposition, after which no identifiable product can be isolated from the reaction mixture. Why the position of a group so far removed from the esterified carboxyl should have such a great influence upon the hydrolysis of the ester is not known, but repeated variations of the hydrolysis showed the foregoing observation to be correct.

The ethylidene acids are reduced by means of hydrogen and a catalyst to give the alkoxy-1-ethyl-2 - methyl-2-carboxyl - 1,2,3,4 - tetrahydronaphthalenes. Other methods of reduction may be employed and will be found equally operative, such as a reduction with hydrogen and palladium, hydrogen and platinum oxide, hydrogen and platinum, as well as conventional methods of chemical reduction.

The alkoxy group is readily transformed into a hydroxy by the use of a mild dealkylating agent such as pyridine hydrochloride. Stronger dealkylating agents such as HBr and HI may be used, but are not required. In place of the carbomethoxy compound, other lower aliphatic esters of 2-methyl-2-carboxy-1-keto-1,2,3,4-tetrahydronaphthalene may be employed, such as the esters of ethyl, propyl, isopropyl, butyl, amyl, n-hexyl, and other similar alcohols with the 2-carboxyl group.

The following examples are illustrative only and are not to be construed as limiting.

PREPARATION 1.—6-METHOXY-2-METHYL-2-CARBOMETHOXY-1- ETHYL-1- HYDROXY-1,2,3,4- TETRAHYDRONAPHTHALENE

Ten and six-tenths grams of 6-methoxy-2-methyl-2-carbomethoxy-1-keto-1,2,3,4 - tetrahydronaphthalene was dissolved in 125 milliliters of dry ether and 50 milliliters of dry thiophene-free benzene contained in a 250-milliliter three-neck flask, fitted with a reflux condenser, mechanical stirrer, and dropping funnel with gas inlet tube. Stirring was started, the apparatus flushed with dry nitrogen, and 40 millileters of an ethereal solution of ethylmagnesium bromide containing 0.00125 mole of the Grignard reagent per milliliter was added dropwise. The reaction mixture was stirred at room temperature for 0.5 hour, then decomposed with cold 5 per cent sulfuric acid. The aqueous layer was separated, extracted twice with ether, combined ethereal layers washed respectively with sodium bicarbonate solution and water, and dried over anhydrous sodium sulfate. Spontaneous evaporation of the solvent gave 9.80 grams (87 per cent) of the desired product which was a white crystalline material. Recrystallization from petroleum ether gave a product, M. P. 100.5–101 degrees centigrade.

Anal.—Calcd. for $C_{16}H_{22}O_4$: C, 68.71 H, 7.88. Found: C, 68.71 H, 7.71.

*Example 1.—6 - methoxy - 2 - methyl - 2 - carbomethoxy-1-ethylidene-1,2,3,4-tetrahydronaphthalene*

Five grams of 6-methoxy-2-methyl-2-carbomethoxy-1-ethyl-1-hydroxy-1,2,3,4 - tetrahydronaphthalene (Preparation 1) and 20 milliliters of 85 per cent formic acid were heated together on a steam bath for one hour. The formic acid was removed in vacuo at 40 degrees centigrade and the residual oil taken up in benzene. The solution was washed with sodium bicarbonate solution, then with water, and finally was distilled. The desired product, boiling at 135–140 degrees centigrade (0.08 mm. Hg) was collected; weight 3.70 grams (80 per cent).

*Example 2.—6-methoxy-2-methyl-2-carboxy-1-ethylidene-1,2,3,4-tetrahydronaphthalene*

Three and thirty-two hundredths grams of 6-methoxy-2-methyl-2-carbomethoxy - 1 - ethylidene - 1,2,3,4 - tetrahydronaphthalene (Example 1) was refluxed for 12 hours with 30 milliliters of 15 per cent methanolic potassium hydroxide. The alcohol was distilled and the solid residue taken up in water. The solution was extracted once with ether to remove a small amount of neutral material; then acidified with five per cent hydrochloric acid. After standing overnight at ice temperature, there was obtained 2.63 grams (84 per cent) of the desired product, which, after recrystallization from dilute methanol, melted at 113–115 degrees centigrade with decomposition.

Anal.—Calcd. for $C_{15}H_{18}O_3$: C, 73.17; H, 7.32. Found: C, 72.91; H, 7.41.

*Example 3. — 6-methoxy-2-methyl-2-carboxy-1-ethyl-1,2,3,4-tetrahydronaphthalene*

One gram of 6-methoxy-2-methyl-2-carboxy-1-ethylidene-1,2,3,4-tetrahydronaphthalene (Example 2) was dissolved in 40 milliliters of 95 per cent ethanol and hydrogenated at room temperature and atmospheric pressure using palladinized charcoal as a catalyst. After removal of the catalyst and solvent, the remaining oil solidified. Crystallization from methanol gave 0.6 gram of the desired product, melting at 131–132 degrees centigrade.

Anal.—Calcd. for $C_{15}H_{20}O_3$: C. 7260; H, 8.11. Found: C, 72.57; H, 7.99.

*Example 4. — 6-hydroxy-2-methyl-2-carboxy-1-ethyl-1,2,3,4-tetrahydronaphthalene*

A mixture of 0.53 gram of 6-methoxy-2-methyl-2-carboxyl-1-ethyl - 1,2,3,4 - tetrahydronaphthalene (Example 3) and six grams of pyridine hydrochloride was heated for three hours at 185–195 degrees centigrade. After cooling, the reaction mixture was poured into water and extracted repeatedly with ether. The ethereal layer was washed with dilute hydrochloric acid, then with water, and was finally dried. Removal of the ether gave 0.3 gram of an oil which solidified on standing. Crystallization from methylcyclohexane gave the desired product, melting at 150.5–152 degrees centigrade.

Anal.—Calcd. for $C_{14}H_{18}O_3$: C, 71.79; H, 7.60. Found: C, 71.78; H, 7.70.

PREPARATION 2.—METHYL 7 - METHOXY -1- KETO-1,2,3,4-TETRAHYDRONAPHTHALENE-2-GLYOXALATE

Seventeen and six-tenths grams of 7-methoxytetralone-1 was condensed with dimethyl oxalate according to the procedure of Bachman, Cole, and Wilds, J. Am. Chem. Soc. 62, 831 (1940). Twenty-six and two-tenths grams (100 per cent) of the desired product was obtained and was suitable for use without further purification. When crystallized from methanol, fine needles, M. P. 80–81 degrees centigrade, were obtained.

Anal.—Calcd. for $C_{14}H_{14}O_5$: C, 64.12; H, 5.34. Found: C, 64.19; H, 5.40.

PREPARATION 3.—7-METHOXY-2-CARBOMETHOXY-1-KETO-1,2,3,4-TETRAHYDRONAPHTHALENE

Twenty-six and two-tenths grams of methyl 7 - methoxy-1-keto-1,2,3,4 - tetrahydronaphthalene-2 - glyoxalate (Preparation 2) was decarbonylated by heating with 12.0 grams of powdered soft glass at 185 degrees centigrade. Twenty-two grams (84 per cent) of the desired product, distilling at a pressure of 0.2 mm. Hg was obtained, and could be used without further purification. The oil is rather difficult to crystallize. Its 2,4-dinitrophenylhydrazone melts at 177–178 degrees centigrade.

Anal.—Calcd. for $C_{19}H_{18}N_4O_7$: C, 55.107; H, 4.38; N, 13.52. Found: C, 54.97; H, 4.12; N, 13.62.

PREPARATION 4.—7-METHOXY-2-METHYL-2-CARBOMETHOXY-1-KETO - 1,2,3,4 - TETRAHYDRONAPHTHALENE

To a solution of 10 grams of sodium in 200 milliliters of anhydrous methyl alcohol was added a solution of 20 grams of 7-methoxy-2-carbomethoxy - 1-keto-1,2,3,4-tetrahydronaphthalene (Preparation 3) in 100 milliliters of dry thiophene-free benzene and 100 milliliters of anhydrous methyl alcohol. Twenty-five milliliters of methyl iodide was added to the cooled mixture and, after standing for two hours, the mixture was refluxed for one hour. After cooling, the solution was neutralized with acetic acid and the benzene and alcohol removed almost completely on the steam bath. The residue was extracted with benzene, the organic layer then washed with sodium bicarbonate solution and water, and dried. Upon removal of solvent the material was recrystallized from petroleum ether to give a white crystalline product which melted at 92–93 degrees centigrade.

Anal.—Calcd. for $C_{14}H_{16}O_4$: C, 67.74; H, 6.45. Found: C, 67.70; H, 6.53.

PREPARATION 5.—7-METHOXY-2-METHYL-2-CARBOMETHOXY-1-ETHYL -1 - HYDROXY-1,2,3,4-TETRAHYDRONAPHTHALENE

Ten and three-tenths grams of 7-methoxy-2-methyl - 2 - carbomethoxy-1-keto-1,2,3,4-tetrahydronaphthalene (Preparation 4) was dissolved in 125 milliliters of dry ether and 50 milliliters of dry thiophene-free benzene and treated with 40 milliliters of an ethereal solution of ethylmagnesium bromide as described in Preparation 1. The desired product (9.53 grams, 82 per cent) was obtained and crystallized from petroleum ether to give a product melting at 53.5–54.5 degrees centigrade.

Anal.—Calcd. for $C_{16}H_{22}O_4$: C, 68.71; H, 7.88. Found: C, 68.72; H, 7.48.

*Example 5.—7-methoxy-2-methyl-2-carbomethoxy-1-ethylidene - 1,2,3,4-tetrahydronaphthalene*

A mixture of 3.75 grams of 7-methoxy-2-methyl-2-carbomethoxy - 1 - ethyl-1-hydroxy-1,2,3,4-tetrahydronaphthalene (Preparation 5) and 10 milliliters of 85 per cent formic acid was heated together on a steam bath for one hour. The desired product was isolated as in Example 1, the fraction boiling at 140–145 degrees centigrade (0.08 mm.) and weighing 2.79 grams (81 per cent) being collected.

*Anal.*—Calcd. for $C_{16}H_{22}O_4$: C, 73.85; H, 7.69. Found: C, 73,85; H, 8.08.

*Example 6.—7-methoxy-2-methyl-2-carboxy-1-ethylidene-1,2,3,4-tetrahydronaphthalene*

Four grams of 7-methoxy-2-methyl-2-carbomethoxy-1-ethylidene - 1,2,3,4 - tetrahydronaphthalene (Example 5) was refluxed with 30 milliliters of 45 per cent aqueous potassium hydroxide solution for 12 hours. Water was then added, the solution clarified with decolorizing charcoal and filtered. The cold solution was acidified with five per cent hydrochloric acid, whereupon the acid precipitated. There was obtained 3.3 grams (85 per cent) of crude acid, M. P. 118–163 degrees centigrade. Recrystallization from methanol gave one form, M. P. 178–178.5 degrees centigrade (A). After removal of the methanol, the residue, when crystallized from petroleum ether, gave a second form, M. P. 128–130 degrees centigrade (B).

*Anal.*—Calcd. for $C_{15}H_{18}O_3$: C, 73.17; H, 7.32. Found for cpd. A: C, 73.44; H, 7.39. Found for cpd. B: C, 73.02; H, 7.70.

*Example 7.—7-methoxy-2-methyl-2-carboxy-1-ethyl-1,2,3,4-tetrahydronaphthalene*

Two and fifty-three one hundredths grams of the mixed forms of 7-methoxy-2-methyl-2-carboxy-1-ethylidene-1,2,3,4-tetrahydronaphthalene (Example 6), dissolved in 100 milliliters of 95 per per cent ethanol, was hydrogenated at room temperature and atmospheric pressure using palladinized charcoal as a catalyst. After removal of the catalyst and solvent, an oil was obtained which solidified upon standing. Crystallization from petroleum ether gave 2.2 grams of desired product melting at 115–116.5 degrees centigrade.

*Anal.*—Calcd. for $C_{15}H_{20}O_3$: C, 72.60; H, 8.11. Found: C, 72.97; H, 8.36.

*Example 8.—7-hydroxy-2-methyl-2-carboxy-1-ethyl-1,2,3,4-tetrahydronaphthalene*

Seven-tenths gram of 7-methoxy-2-methyl-2-carboxy-1-ethyl - 1,2,3,4 - tetrahydronaphthalene (Example 7) and 8.6 grams of pyridine hydrochloride were heated at 185–195 degrees centigrade for three hours. After cooling, the mixture was poured into water, extracted repeatedly with ether, the ethereal layer washed with dilute hydrochloric acid and water, and then dried. Removal of the solvent gave 0.54 gram (82 per cent) of the desired product, which melted at 169–171 degrees centigrade after crystallization from methyl cyclohexane.

*Anal.*—Calcd. for $C_{14}H_{16}O_3$: C, 71.29; H, 7.69. Found: C, 71.69; H, 7.86.

Various modifications may be made in the invention without departing from the spirit or scope thereof, and it is to be understood that we limit ourselves only as defined in the appended claims.

We claim:
1. A compound having the formula

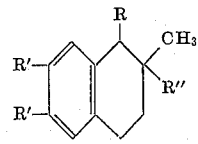

wherein R is a member of the group consisting of

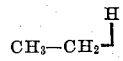

and $CH_3$—$CH$=; one R' is a member of the group consisting of hydroxy and alkoxy, the other R' being hydrogen; and wherein R'' is a member of the group consisting of carboxy and carbomethoxy.

2. 6-hydroxy-2-methyl - 2 - carboxyl-1-ethyl-1,2,3,4-tetrahydronaphthalene.

3. 6-methoxy-2-methyl - 2 - carbomethoxy-1-ethylidene-1,2,3,4-tetrahydronaphthalene.

4. 7-methoxy-2-methyl - 2 - carbomethoxy-1-ethylidene-1,2,3,4-tetrahydronaphthalene.

5. A method for the preparation of a compound having the formula

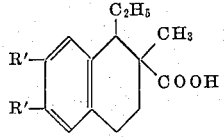

wherein one R' is a hydroxyl, the other R' being hydrogen, comprising reacting a compound having the formula

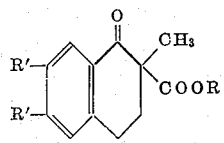

wherein R is a lower alkyl group, and wherein the same R' as is hydroxyl in the desired compound is an alkoxy group, the other R' being hydrogen, with ethylmagnesium bromide, dehydrating to form an ethylidene double bond, reducing the ethylidene double bond, hydrolyzing the ester group to a free carboxyl group, and dealkylating the alkoxy group in the product thus formed.

JAMES H. HUNTER.
JEROME KORMAN.

REFERENCES CITED

The following references are of record in the file of this patent:

UNITED STATES PATENTS

| Number | Name | Date |
| --- | --- | --- |
| 2,198,374 | Bruson et al. | Apr. 23, 1940 |

FOREIGN PATENTS

| Number | Country | Date |
| --- | --- | --- |
| 468,375 | Great Britain | July 1, 1937 |

OTHER REFERENCES

Whitmore: "Organic Chemistry," page 669, 1 page (1937).

Bachmann et al.: J. A. C. S., vol. 63 (1941), pp. 598–602.

Bachmann et al.: J. Am. Chem. Soc., vol. 64 (1942), pp. 94–97.

Miescher et al.: Helv. Chim. Acta, vol. 28 (1945), pp. 1343–1344.

Horeau: Compt. Rendus, vol. 122, Apr. 15, 1946, pp. 961–962.